Figure 1:
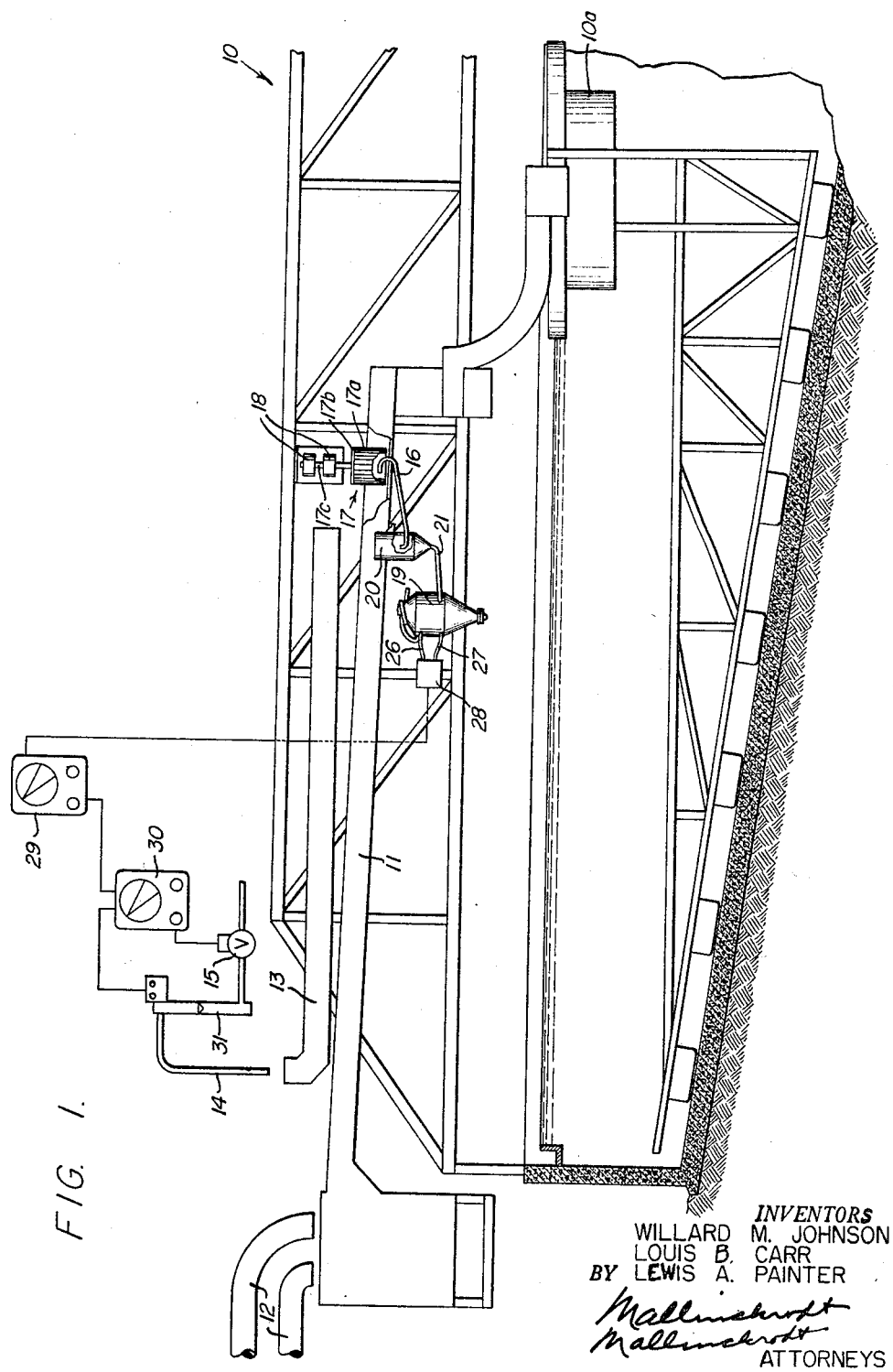

Nov. 22, 1966

W. M. JOHNSON ETAL  3,287,263
METHOD OF AND APPARATUS FOR CONTROLLING ADDITION
OF REAGENTS TO THE FEED OF PHASE
SEPARATION VESSELS

Filed Jan. 11, 1963

3 Sheets-Sheet 1

INVENTORS
WILLARD M. JOHNSON
LOUIS B. CARR
BY LEWIS A. PAINTER

*Mallinckrodt*
*Mallinckrodt*
ATTORNEYS

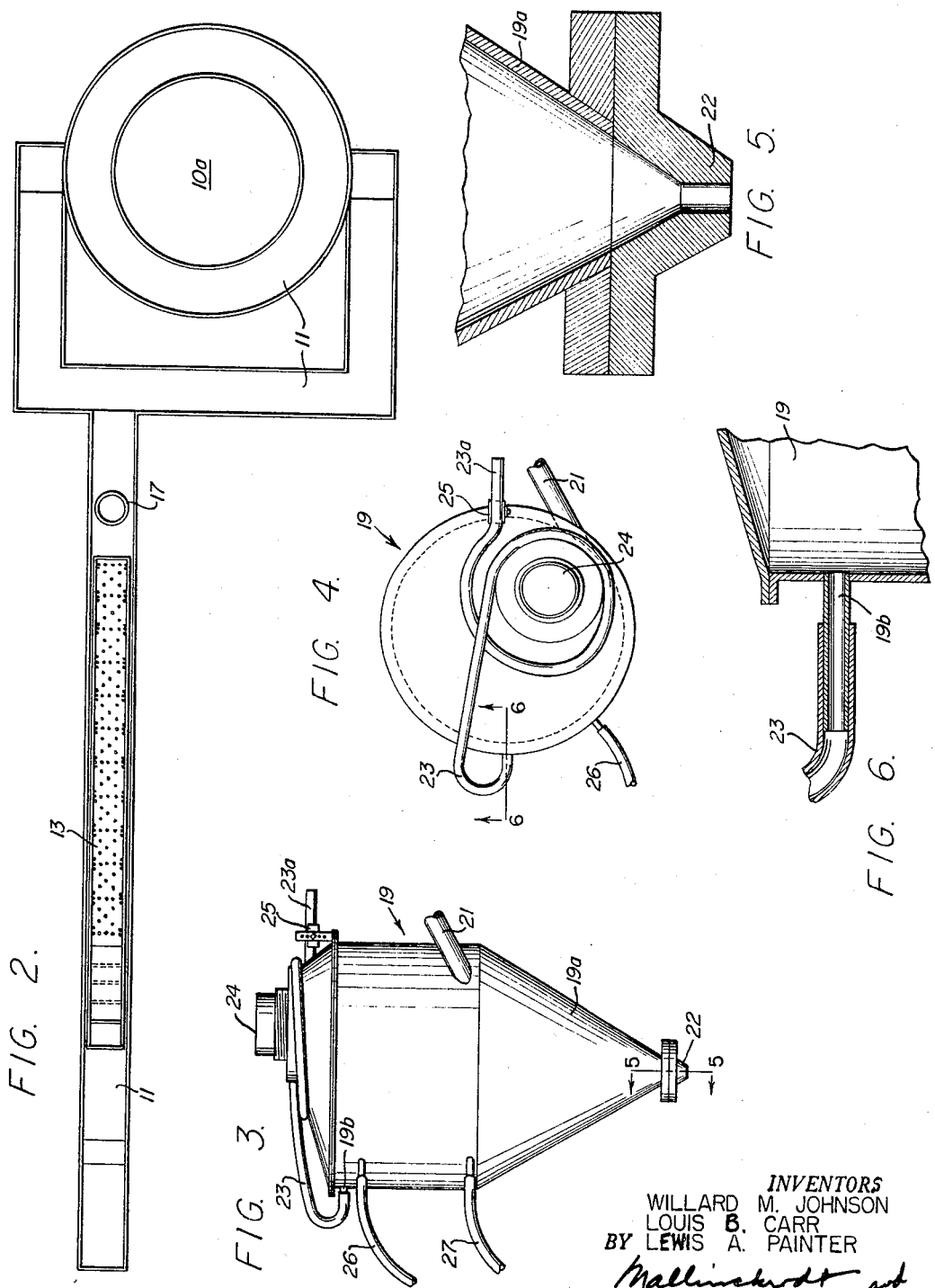

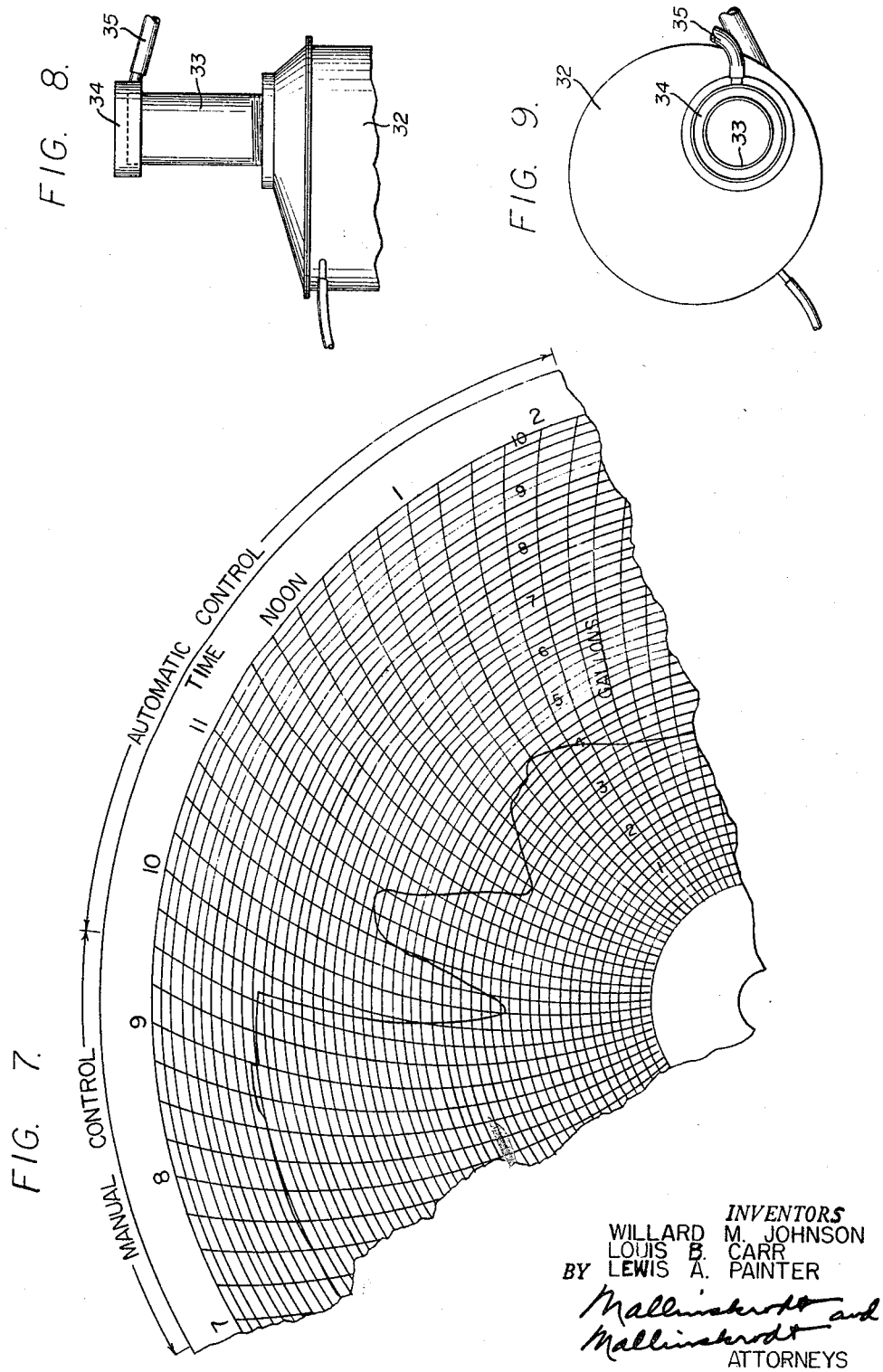

United States Patent Office 3,287,263
Patented Nov. 22, 1966

3,287,263
METHOD OF AND APPARATUS FOR CONTROLLING ADDITION OF REAGENTS TO THE FEED OF PHASE SEPARATION VESSELS
Willard M. Johnson, Moab, Utah, Louis B. Carr, Cloudcroft, N. Mex., and Lewis A. Painter, Kirkwood, Mo., assignors to Atlas Corporation, New York, N.Y., a corporation of Delaware
Filed Jan. 11, 1963, Ser. No. 250,899
10 Claims. (Cl. 210—48)

This invention is concerned in general with the automatic control of industrial processes and provides both a method and apparatus for controlling the addition of a reagent material to the feed of a continuously-fed settling vessel being utilized for liquid and solids phase separation.

The invention is especially applicable to industrial settling apparatus, such as the thickeners and clarifiers that are widely used in the metallurgical and chemical arts for separating much of the liquid phase from the solids phase of metallurgical pulps, slurries, and other semi-liquid materials as, for example, sewage passing through sewage-treatment plants and turbid water passing through water-purification plants.

In the treatment of these various pulps, slurries, and other semi-liquid materials in thickeners, clarifiers, or similar types of settling vessels, to either increase density of the solids phase by eliminating a large part of the liquid or to purify the liquid phase by removing undesirable solids, it is customary to add reagents, such as flocculants or coagulants for agglomerating solid particles to thereby increase their settling rate. Where all conditions are constant from time to time, the amount of an addition reagent necessary to accomplish the purpose can be determined by trial and error and adhered to thereafter. However, where conditions, such as feed rate, solids content, character of the feed, etc., vary from time to time, it is necessary to change the amount of the addition reagent correspondingly if one is to avoid functionally insufficient or uneconomically large amounts of such reagent.

For example, with metallurgical pulps there is like to be considerable variation from time to time in the relative quantities of ore particles of different sizes present in the feed to a thickener. These changes in sand-slime ratio, as the particle size relationship is often referred to, makes it desirable to have corresponding changes in the amounts of flocculant reagent added to the feed for obtaining the hastened settling rate desired. Otherwise, much of the flocculant reagent is wasted, for it is considered better practice to use too much than too little.

In the instance of a particular metallurgical pulp it has been found that careful control of the addition rate of a flocculant reagent to the thickener feed has reduced consumption of the reagent by almost two-thirds, with better operating results than previously when reagent addition was at a set rate. Considering the fact that several hundred pounds of the reagent are normally used during each day of operation of such a system and that the cost of the reagent is often in the neighborhood of one dollar a pound, the importance of careful control can be readily appreciated. Savings of several hundred dollars a day are possible. Yet, it is impractical to attempt to cope manually with the unpredictable changes in reagent requirements.

A principal object in the making of this invention was to provide for automatically controlling the introduction of a reagent to the feed of a settling vessel in amounts determined by changing requirements from time to time during operation of such settling vessel.

Features of the invention from a method standpoint in the achievement of this object are the taking, continuously, of a sample of the final feed to the settling vessel following introduction of the flocculant or coagulant thereto; the passing of such continuous sample into a special, relatively small, gravity-separation vessel, where representative settling takes place; the flowing from such separation vessel of the liquid and solids phases separately at a volume ratio predetermined by conditions desired in the settling vessel; the sensing of the interface level between such liquid and solids phases in the separation vessel; and the adjusting of flocculant or coagulant additions to the feed stream in accordance with variations in such interface level from time to time during operation of the system.

A preferred way of achieving any desired ratio of flow of the liquid (overflow) and solids (underflow) phases of the sample from the special separation vessel is by providing a restricted, gravity-outflow orifice for each, the two orifices being of such relative sizes as will establish the desired quantitative ratio of outflow. Other ways will be apparent, for example, by metered pumping, by regulating inflow of the sample to the separation vessel and outflow of only one of the separated phases, etc.

Sensing of the interface level between liquid and solids phases in the special separation vessel is easily accomplished, as by means of a float arranged to ride the interface or by means of a standard differential pressure (d/p) cell, which measures pressure differentials established by the respective phases. In either event, signals are transmitted by some suitable medium, e.g. pneumatically or electrically, into a control mechanism arranged to control introduction of an addition agent, such as a flocculant or coagulant, to the feed of the settling vessel concerned.

There are shown in the accompanying drawings different forms of apparatus presently regarded as the best mode of carrying out the invention as applied to a metallurgical pulp thickening operation. From the detailed description of these, other more specific objects and features of the invention will become apparent.

In the drawings:

FIG. 1 is a fragmentary representation, partly schematic, of a conventional thickener for metallurgical pulp and of apparatus making up a system in accordance with the invention for automatically controlling the addition of relatively small quantities of a flocculant solution to the feed of the thickener, portions of such system being shown diagrammatically;

FIG. 2, a corresponding top plan view showing only the feed launders;

FIG. 3, a view, drawn to a considerably larger scale, showing in elevation the special gravity-separation vessel which appears in FIG. 1 as part of the control apparatus, only fragmentary portions of connecting conduits being illustrated;

FIG. 4, a top plan view of the special vessel of FIG. 3;

FIG. 5, a fragmentary vertical section taken on the line 5—5 of FIG. 3 and drawn to a considerably larger scale;

FIG. 6, a fragmentary vertical section taken on the line 6—6 of FIG. 4 and drawn to the scale of FIG. 5;

FIG. 7, a fragmentary portion of a typical circular chart from the recorder-controller, showing comparative traces made when the system was operating under manual control and when the system was under the automatic control provided by the invention;

FIG. 8, a fragmentary view corresponding to the upper part of FIG. 3 but showing a somewhat different embodiment; and FIG. 9, a view corresponding to that of FIG. 4, but showing the embodiment of FIG. 8.

Referring to the drawings:

The system illustrated in FIG. 1 represents a typical application of the invention to a standard thickener in the processing of a metallurgical pulp or slurry, as, for example, for increasing the density of a leach mixture of finely divided uranium ore and sodium carbonate solution in an overall process of extracting and recovering the uranium from the ore.

The leach pulp or slurry to be thickened is run into the feed well 10a of a standard thickener 10, i.e. settling vessel, in a continuous stream from a feed launder 11 fed by conduits 12 which extend from an ore-grinding circuit (not shown).

For accelerating the settling action in the thickener, a relatively small quantity of a solution of a suitable flocculant is introduced into the feed to the thickener, as is accepted practice. Instead of introducing such reagent on a set quantitative basis, however, as is customary, the amount is controlled according to variations in conditions from time to time which make the use of more or of less of the reagent desirable.

The flocculant is stored as a dilute solution in any suitable tank or other reservoir (not shown) and is passed therefrom into a launder 13 by means of a pipe 14, the flow being controlled by a power-operated valve 15 which meters the quantity discharged into reagent launder 13 in accordance with the varying demands of the system.

Launder 13 is preferably perforated along much of its length, as shown in FIG. 2, and extends on the horizontal along and directly above main feed launder 11, so as to distribute the reagent over a broad area of the main feed stream of the metallurgical pulp or slurry.

For control purposes, the main feed stream is continuously sampled, as by means of a sample cutter 16, FIG. 1, located downstream from the flocculant feed and protected from debris by a screen 17.

The sample cutter 16 is advantageously a pipe, having an open, intake end submerged in the stream of pulp or slurry and directed upstream, so as to continuously cut a relatively small, representative stream of pulp or slurry from the main stream of the final feed passing to the thickener.

The screen 17 is advantageously of novel rotary type comprising a multiplicity of narrowly spaced staves or fingers 17a depending in cylindrical arrangement and essentially squirrel cage formation from a ring carrier 17b fixed to a shaft 17c journaled in bearings 18. It is placed so as to surround the open end of the sample cutter, and is rotated by the flow of the material along main feed launder 11.

It is desirable that the pulp or slurry cut from the main stream be de-aerated before being passed into the special gravity-separation vessel 19 to serve in a control capacity, so there will be no undesirable effect on the settling rate. To this end, sample cutter pipe 16 leads into a de-aerating chamber 20, which, in turn, discharges into vessel 19 by way of a pipe 21.

The special gravity-separation vessel 19, see particularly FIGS. 3–6, has preferably a conical bottom 19a to facilitate restricted, gravity discharge of solids through a calibrated nozzle 22 at the bottom apex of the cone, as an underflow, and has an outlet 19b near its top to which is connected an elongate, and conveniently coiled, hose 23 for restricted, gravity discharge of liquid as an overflow. The vessel is covered at its top, but has an air vent 24 therein.

As previously indicated, the sample stream is introduced into vessel 19 for the purpose of undergoing phase separation and providing a continuing indication of needed changes in the rate of flocculant feed. In order to make conditions in vessel 19 representative of conditions in thickener 10 at all times, the separated liquid and solids phases are separately discharged from such vessel 19 on a continuous basis and at a volumetric ratio predetermined by conditions desired in the thickener. Thus, if the settling rate desired in the thickener is represented by the obtaining of one inch of clear liquid in three minutes by a standard settling test performed in the laboratory, the volumetric ratio of discharge from vessel 19 of clear liquor through hose 23 to discharge of settled solids through nozzle 22 should be one to fourteen.

In practice, nozzle 22 is calibrated to give the desired underflow discharge rate at a particular head pressure determined by the elevation of de-aerating chamber 20. The size and length of flow-restricting hose 23 is selected to give the desired overflow discharge rate with an outflow opening from vessel 19 large enough to prevent plugging. A height-adjustable holder 25 for the discharge end of hose 23 enables the elevation of such discharge end to be adjusted to change the overflow rate as may be required from time to time. In other applications, where the ratio of overflow to underflow may be reversed, a flow-restricting hose can be utilized to control the discharge rate of the underflow.

Pipe 21 advantageously enters vessel 19 tangentially above conical bottom 19a, to provide mild agitation for preventing the build up and sloughing off of solids which could cause plugging. Both the underflow and the overflow preferably discharge directly into the thickener.

Settling of solids in the special gravity-separation vessel 19 establishes an interface between liquid and solids, which fluctuates in accordance with fluctuations in the character of the pulp or slurry feed and which indicates whether more or less of the flocculant is required to maintain the desired conditions in the thickener.

In order to measure the deviations from an arbitrarily selected normal interface level and use such measurements for control purposes, means are provided for sensing the interface level within gravity-separation vessel 19. Such means advantageously takes the form of differential pressure tubes 26 and 27 positioned, respectively, above and below the normal interface level by distances permitting the widest range of fluctuations in such level to take place therebetween. These tubes are connected to a standard differential pressure cell 28, FIG. 1, so that interface level is measured.

In the illustrated system, output signals from cell 28, which may be either pneumatic or electric, are conducted to a standard recorder-controller 29 for recording fluctuations in interface level and are relayed from there to a second recorder-controller 30 for recording and controlling flocculant consumption. Such recorder-controller 30 is connected to valve 15 for controlling flocculant input to reagent launder 13 in accordance with fluctuations in the interface level in gravity-separation vessel 19. A flow meter 31 measures the input flow of such flocculant and transmits the measurements to recorder-controller 30 for recording.

Because the conditions within gravity-separation vessel 19 are continually representative of what conditions would be in thickener 10 were given rates of flocculant addition to be maintained over respective significant periods of time, changes in flocculant feed effected by the apparatus of the invention from time to time throughout the operation of the processing system will tend to maintain the most efficient operating conditions and will result in substantial savings in reagent consumption. In a typical instance of the processing of uranium ore, a reduction in cost from thirty-two cents to twelve cents per ton of ore processed was achieved.

A graphic indication of these savings appears in FIG. 7, where there is illustrated a portion of a circular chart made by the recorder-controller 30 over a period of two and one-half hours of operation of the system on a manual basis, with the quantity of flocculant used being uniform throughout the period and set in accordance with prior practice, and over a subsequent period of more than five hours of operation on an automatic basis in accordance with the invention, with the quantity of flocculant used fluctuating from time to time in accordance with the actual needs of the system.

As has been previously pointed out, in the embodiment of apparatus described above the separated liquid and solids phases of the feed sample in gravity-separation vessel 19 are discharged from such vessel through overflow 23 and through underflow 22, respectively, on a continuous basis, and, because these are properly proportioned, the discharge is at a volumetric ratio predetermined by conditions desired in thickener 10.

The proper proportioning of overflow and underflow gravity discharges is not the only way of achieving discharge of separated liquid and solids phases of the sample feed from the relatively small gravity-separation vessel at a volumetric ratio predetermined by conditions desired in the settling vessel. As indicated hereinbefore, other means may be employed. For example, as shown in FIGS. 8 and 9, the feed to gravity-separation vessel 32 can be controlled by sizing the intake orifice of sample cutter 16 in accordance with desired overflow volume and by providing an unrestricted overflow through air vent conduit 33 into circumferential launder 34 which empties directly into the thickener 10 by way of hose 35.

The gravity-separation vessel need not be of any considerable size, although there should be at least about twelve inches between pressure taps for the $d/p$ cell. A very satisfactory and typical installation in connection with a thickener of approximately 380,000 gallons operating on an overflow to underflow ratio of one to fourteen utilizes a gravity-separation vessel of the type illustrated in FIGS. 3 and 4 having a total height of thirty-eight inches and maximum diameter of twenty-four inches with a volumetric capacity of approximately 33 gallons. The underflow discharge passage through the calibrated nozzle 22 is one-half inch in diameter and the restricted overflow discharge passage through the hose 23 is three-eighths of an inch in diameter and has a length of eighteen feet.

Whereas there are here illustrated and described procedures and apparatus which we presently regard as the best mode of carrying out our invention, it should be understood that various changes can be made without departing from the inventive concepts particularly pointed out hereinbelow.

We claim:
1. A method of controlling the addition of a reagent to the feed of a continuously-fed settling vessel for liquid-solids phase separation, comprising:
   continuously withdrawing a sample of the final feed material from the final feed stream to such apparatus;
   continuously flowing said sample into a relatively small, gravity-separation vessel for representative phase separation;
   separately discharging the separated liquid and solids phases of the sample from the gravity-separation vessel on a continuous basis at a volumetric ratio predetermined by conditions desired in said settling vessel;
   sensing changes in the interface level between said liquid and solids phases of said sample in the separation vessel;
   and adjusting the reagent addition in accordance with variations in said interface level.

2. The method set forth in claim 1, wherein the predetermined volumetric ratio of discharge of the separated liquid and solids phases from the separation vessel is established by restricting gravity discharge of said phases relative to each other in accordance with said predetermined ratio.

3. The method set for in claim 1, wherein the predetermined volumetric ratio of discharge of the separated liquid and solids phases from the separation vessel is established by restricting, relative to each other, gravity discharge of one of said phases and inflow of the sample of final feed material into the separation vessel in accordance with said predetermined ratio.

4. The method set forth in claim 1, wherein the sample of the final feed material is de-aerated before being passed to the gravity-separation vessel.

5. The method set forth in claim 1, wherein changes in the interface level are sensed by means productive of signals representative of the changes; wherein the signals are passed to a controller; and wherein reagent addition is adjusted by valve means controlled by said controller.

6. Apparatus for controlling the addition of a reagent to the feed of a continuously-fed settling vessel for liquid-solids phase separation, comprising:
   means for continuously withdrawing a sample of the final feed material from the final feed stream to such apparatus;
   a relatively small gravity-separation vessel for carrying out representative phase separation of said sample;
   means for continuously flowing said sample into the gravity-separation vessel;
   means for separately discharging the separated liquid and solids phases of the sample from the gravity-separation vessel on a continuous basis at a volumetric ratio predetermined by conditions desired in said settling vessel;
   means for sensing changes in the interface level between said liquid and solids phases of said sample in the separation vessel;
   and means for adjusting the reagent addition in accordance with variations in said interface level.

7. The apparatus set forth in claim 6, wherein there is also provided means for de-aerating the sample of feed material prior to flowing it into the gravity-separation vessel.

8. The apparatus set forth in claim 6, wherein there is also provided means for screening the inflow of feed material to the sample withdrawing means.

9. The apparatus set forth in claim 6, wherein the means for separately discharging the liquid and solids phases at the predetermined volumetric ratio includes a calibrated nozzle for the underflow, and an elongate hose providing a restricted passage for the overflow.

10. The apparatus set forth in claim 6, wherein the means for separately discharging the liquid and solids phases at the predetermined volumetric ratio includes a calibrated nozzle for the underflow, an unrestricted overflow opening, and a restricted intake for the sample withdrawing means.

References Cited by the Examiner

UNITED STATES PATENTS

| 1,957,898 | 5/1934 | Mitchell | 210—96 |
| 2,858,024 | 10/1958 | Babcock | 210—143 X |

FOREIGN PATENTS

| 457,618 | 6/1949 | Canada. |

OTHER REFERENCES

"Control of Sand in Water Systems," Rossum, Jour. AWWA, February 1954, vol. 46, pp. 123–132.

MORRIS O. WOLK, *Primary Examiner.*

M. E. ROGERS, *Assistant Examiner.*